United States Patent [19]
Kamikubo

[11] Patent Number: 6,115,164
[45] Date of Patent: Sep. 5, 2000

[54] SCANNING OPTICAL SYSTEM

[75] Inventor: Junji Kamikubo, Tokyo, Japan

[73] Assignee: Asahi Kogaku Kogyo Kabushiki Kaisha, Tokyo, Japan

[21] Appl. No.: 09/119,651

[22] Filed: Jul. 21, 1998

[30] Foreign Application Priority Data

Jul. 22, 1997 [JP] Japan ................................. 9-211367

[51] Int. Cl.⁷ .................................................. G02B 26/08
[52] U.S. Cl. ........................... 359/196; 359/17; 359/212; 359/215; 359/216; 359/566; 359/574
[58] Field of Search ..................................... 359/196–226, 359/17, 558, 563, 565, 566, 569, 570, 574, 575; 347/225, 233, 241–245, 256–261, 263

[56] References Cited

U.S. PATENT DOCUMENTS

| | | | |
|---|---|---|---|
| 5,629,799 | 5/1997 | Maruyama et al. | 359/565 |
| 5,838,480 | 11/1998 | McIntyre et al. | 359/205 |

*Primary Examiner*—James Phan
*Attorney, Agent, or Firm*—Greenblum & Bernstein, P.L.C.

[57] ABSTRACT

Disclosed is a scanning optical system including a light source that emits a light beam, a deflector that deflects a light beam emitted from the light source to scan in a predetermined direction, an scanning lens system that allows the light beam deflected by the deflector to pass through and converges the light beam on a surface to be scanned, and a diffracting element having a diffracting surface that functions to correct a chromatic aberration of the scanning lens. The diffracting element is arranged between the deflector and the surface to be scanned.

20 Claims, 7 Drawing Sheets

SCANNING OPTICAL SYSTEM

BACKGROUND OF THE INVENTION

The present invention relates to a scanning optical system employed in a laser scanning unit for a laser printer and the like.

In scanning optical systems, a light beam emitted from a laser light source is deflected by a deflector such as a polygon mirror and is converged on a surface to be scanned such as a photoconductive surface of a photoconductive drum or the like as a beam spot, through a scanning lens such as an fθ lens. As the polygon mirror rotates, the beam spot on the photoconductive drum scans the photoconductive drum in a main scanning direction. By modulating the laser beam as the polygon mirror rotates, an electrostatic latent image is formed on the surface to be scanned.

In general, it is considered that a laser beam used as the light source of a scanning optical system has a single wavelength. Therefore, conventional scanning optical systems are designed with respect a predetermined wavelength, and correction of chromatic aberration due to various wavelengths was not taken into consideration.

However, laser diodes, which are used as light sources, may have individual differences in characteristics, and may emit laser beams having different wavelengths. If the wavelength of the emitted laser beam is different from the designed wavelength, drawing characteristics are changed due to the lateral chromatic aberration of a scanning optical system. Further, if a scanning optical system is a multi-beam type scanning optical system utilizing a plurality of laser diodes, drawing characteristics are changed for each scanning line due to the variation of the wavelength among the plurality of laser diodes.

It may be possible to correct the chromatic aberration using positive lenses and negative lenses having different dispersion, as is utilized in a camera lens system. In such case, however, there is a problem that the number of lenses constituting the scanning optical system is increased. In addition, a scanning optical system should be newly designed, and when a molded lens is used, a mold must be newly prepared.

SUMMARY OF THE INVENTION

It is therefore an object of the present invention to provide an improved scanning optical system with which change of characteristics resulting from change of a wavelength of a light beam with a simple arrangement can be suppressed, and further, it is possible to make use of an existing elements of the optical system.

For the above object, according to the invention, there is provided a scanning optical system, comprising: a light source that emits a light beam; a deflector that deflects a light beam emitted from the light source to scan in a predetermined direction; an scanning lens system that allows the light beam deflected by the deflector to pass through and converges the light beam on a surface to be scanned; and a diffracting element having a diffracting surface that functions to correct a chromatic aberration of the scanning lens. The diffracting element is arranged between the deflector and the surface to be scanned.

In particular, the diffracting surface have no power in a paraxial region.

Optionally, the diffracting surface may have a plurality of annular zones concentrically formed about the optical axis, and a macroscopic shape of the diffracting surface may be a concave surface.

Further, each of the annular zones of the diffracting surface are formed to have a flat surface which are parallel to each other.

Further optionally, a surface of the diffraction element on which the diffracting surface is not formed is formed to be a flat surface.

Alternatively, a surface of the diffraction element on which the diffracting surface is not formed may be formed to be a concave surface.

In this case, the concave surface may be formed to have no power in the paraxial region thereof.

Optionally, the diffracting element may be located between said deflector and said scanning lens system.

In addition, the scanning optical system could be a multi-beam type scanning optical system. That is, the light source may be constituted to emit a plurality of light beams, each of which are deflected by the deflector and passing through the diffraction element and the scanning lens system.

Further optionally, the scanning optical system may be provided with a cover unit for covering the deflector. In such a constitution, the diffraction element could be provided at a portion of the cover unit through which the light beam deflected by the deflector and directed towards the scanning lens system passes.

According to another aspect of the invention, there is provided a diffraction element to be interposed in a scanning optical system having a light source that emits a light beam, a deflector that deflects a light beam emitted from the light source to scan in a predetermined direction, and an scanning lens system that allows the light beam deflected by the deflector to pass through and converges the light beam on a surface to be scanned. The diffraction element may have a diffracting surface that functions to correct a chromatic aberration of the scanning lens.

In particular, the diffracting element is arranged between the deflector and the surface to be scanned.

Optionally, a surface of the diffraction element on which the diffracting surface is not formed is formed to be a flat surface.

Alternatively, a surface of the diffraction element on which the diffracting surface is not formed may be formed to be a concave surface.

In this case, the concave surface may be formed to have no power in the paraxial region thereof.

Optionally, the diffraction element may be located between the deflector and the scanning lens.

In particular, the scanning optical system may provided with a cover unit for covering the deflector, and the diffraction element may be provided at a portion of the cover unit through which the light beam deflected by the deflector and directed towards the scanning lens system passes.

DESCRIPTION OF THE EMBODIMENTS

An embodiment of a scanning optical system according to the present invention will be described hereinafter.

Figure 1:
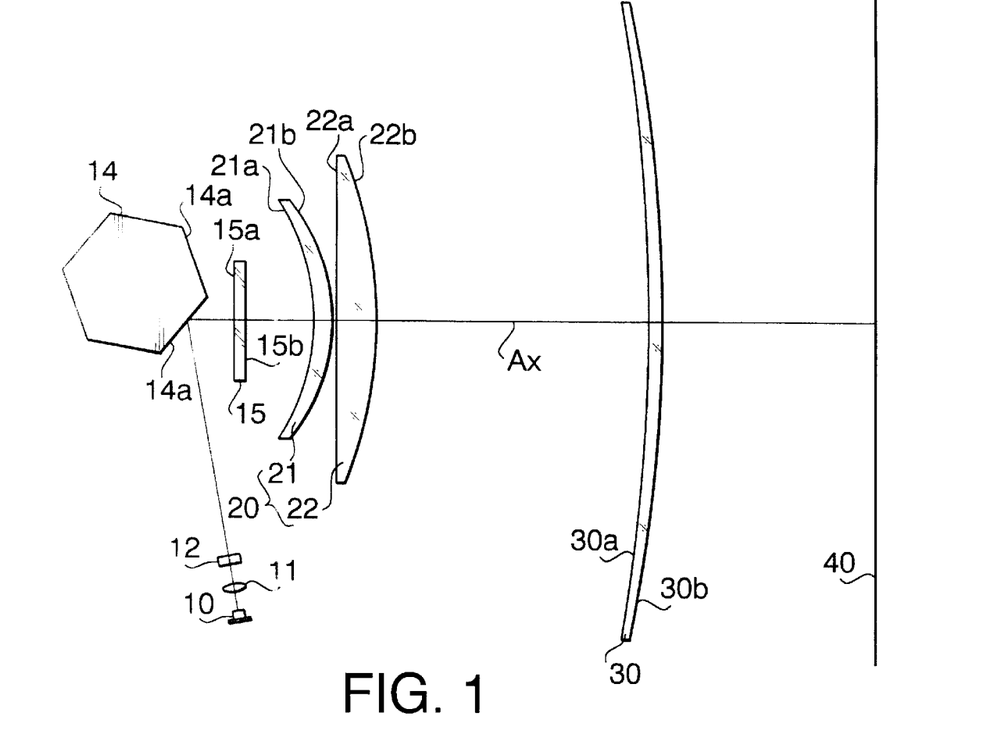
FIG. 1 is a plan view showing a scanning optical system, arranged on a main scanning plane, according to a first embodiment of the present invention.
Figure 2:
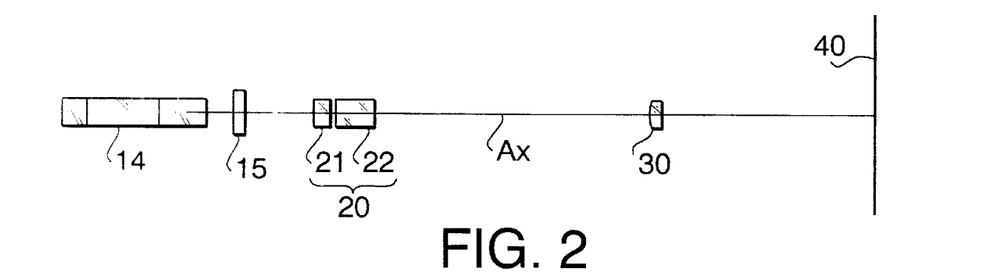
FIG. 2 is a side view of the scanning optical system, arranged on an auxiliary scanning plane, according to the first embodiment.

FIG. 1 is a plan view, and FIG. 2 is a side view of a scanning optical system to which the present invention is applicable.

The scanning optical system shown in FIGS. 1 and 2 is employed in a laser scanning unit of a laser printer. The scanning optical system forms an electrostatic latent image on a photoconductive drum by scanning a laser beam, which is ON-OFF modulated in response to an input image signal.

As shown in FIG. 1 which is a plan view showing an arrangement of optical elements on a main scanning plane, and FIG. 2 which is a side view showing an arrangement of the optical elements on an auxiliary scanning plane. It should be noted that, in this specification, a plane including a principal ray of scanning beam as well as an optical axis Ax is defined as the main scanning plane, and a plane including the optical axis Ax and perpendicular to the main scanning plane is defined as the auxiliary scanning plane. Further, a main scanning direction is defined as a direction in which the scanning beam moves on a plane perpendicular to the optical axis Ax, and an auxiliary scanning direction is defined as a direction which is perpendicular to the main scanning direction on the plane perpendicular to the optical axis Ax.

The scanning optical system has a light source including a laser diode. A diverging light beam emitted from the light source, or the laser diode 10 is converted into a parallel beam by a collimating lens 11 and incident on a reflecting surface 14a of a polygon mirror 14 through a cylindrical lens 12 having a positive power in an auxiliary scanning direction.

Figure 2A:
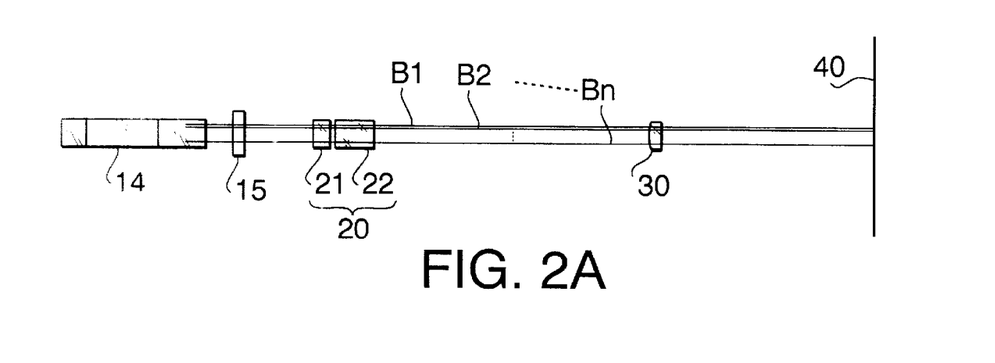
FIG. 2A is a side view of a scanning optical system applied to a multi-beam scanning optical system.

It should be noted that the scanning optical system is also applicable to a multi-beam type scanning optical system provided with a light source emitting a plurality of light beams. In such a case, the plurality of light beams B1, B2, ..., Bn are spaced apart in the auxiliary scanning direction, as shown in FIG. 2A, and incident on the polygon mirror 14 simultaneously. Since, with respect to each of the plurality of beams B1–Bn, the performance is similar to that in the single beam type scanning optical system, description will be made principally with reference to the scanning optical system shown in FIG. 2.

The laser beam deflected by the polygon mirror 14 passes through a diffraction element 15, a scanning lens 20 and a correcting lens 30 and forms a spot on a surface 40 to be scanned so that the surface 40 is scanned in the main scanning direction.

The collimating lens side surface of the cylindrical lens 12 is formed to be a cylindrical surface having a positive power in the auxiliary scanning direction, and the polygon mirror side surface is formed to be a flat surface. The power of the cylindrical lens 12 is determined so that a line-like image is formed by the cylindrical lens 12 in the vicinity of the reflecting surface 14a of the polygon mirror 14.

The light beam reflected by the polygon mirror L4 is incident on the diffraction element 15 as a substantially parallel light beam in the main scanning direction and as a diverging light beam in the auxiliary scanning direction. The diffraction element 15 has a diffracting surface 15a, on the polygon mirror side, for correcting chromatic aberration. The other surface 15b of the diffraction element 15 which is located on the scanning lens side is formed to be a flat shape, in the optical system shown in FIGS. 1 and 2.

The light beam passed through the diffraction element 15 is incident on the scanning lens 20. The scanning lens 20 includes a first lens 21 and a second lens 22 which are arranged in this order from the polygon mirror 14 side. The scanning lens 20 has, as a whole, a positive power in the main scanning direction and a negative power in the auxiliary scanning direction, and the light beam passed though the scanning lens 20 proceeds as a converging light beam in the main scanning direction and as a diverging light beam in the auxiliary scanning direction.

The correcting lens 30 is a lens elongated in the main scanning direction and located in the vicinity of the scanning surface 40 for correcting curvature of field. The lens surface 30a of the correcting lens 30 on the scanning lens side is formed to be an anamorphic surface whose effective refraction power in the auxiliary scanning direction gradually decreases from a center, in the main scanning direction, towards a periphery. The correcting lens 30 has a relatively strong positive power in the auxiliary scanning direction. The light beam passed through the correcting lens 30 proceeds as a converging light beam in both the main and auxiliary scanning directions, and forms a beam spot on the surface 40 to be scanned.

The scanning optical system shown in FIGS. 1 and 2 is designed so as to obtain at least predetermined performance characteristics, even if the diffraction element 15 is not provided, when the light beam emitted from the semiconductor laser 10 has a wavelength that coincides with a design wavelength. In other words, the scanning optical system of the embodiment is constituted such that the diffraction element 15 is inserted into an existing scanning optical system in which chromatic aberration is not corrected. Therefore, the diffraction element 15 only functions to correct the chromatic aberration and does not have a power in the paraxial region. Since chromatic aberration can be corrected by only the addition of the diffraction element, a scanning optical system capable of correcting the chromatic aberration can be constituted using existing optical elements without changing the design thereof.

The shape of the diffraction element 15 will be described with reference to FIGS. 3 to 5.

Figure 3:
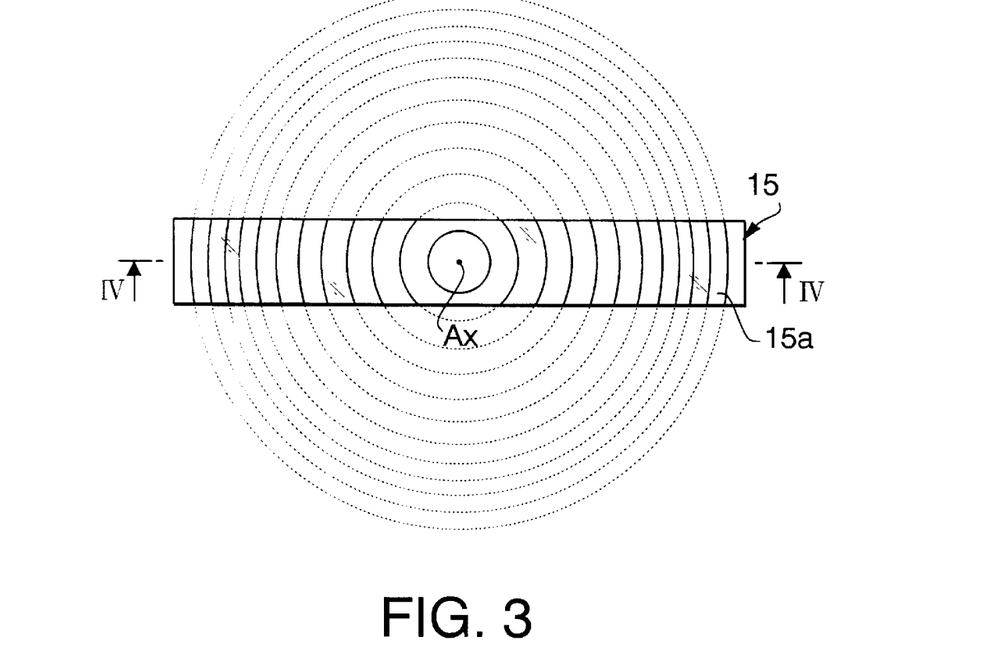
FIG. 3 schematically shows a structure of a diffraction element on a plane perpendicular to an optical axis.
Figure 4:
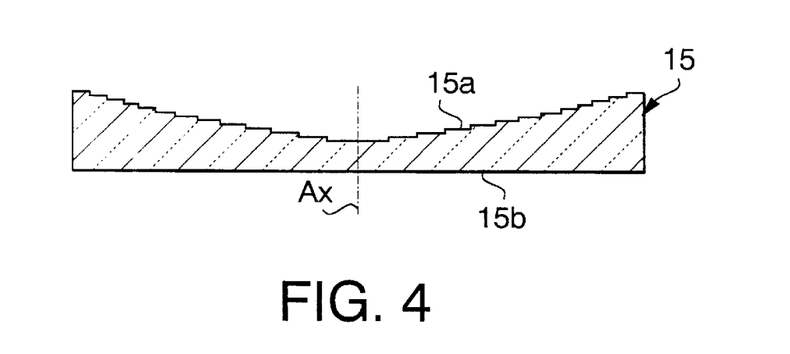
FIG. 4 is a sectional view taken along the line IV—IV of FIG. 3.

FIG. 3 is a front view of the diffraction element 15 viewed from the polygon mirror side, FIG. 4 is a sectional view taken along line IV—IV of FIG. 3. FIG. 5 is a sectional view showing another example of the diffraction element in the same manner as FIG. 4.

As shown in FIG. 3, the diffracting surface 15a of the diffraction element 15 which is located on the polygon mirror 14 side has a plurality of concentric annular zones formed thereonto. For simplifying the drawings, the number of the annular zones shown in FIGS. 3 though 5 is smaller than an actual number. As shown in FIG. 4, each of the annular zones are formed to have a flat surface perpendicular to an optical axis Ax and are processed stepwise. The surfaces of the annular zones are made lowest at the optical axis Ax (at the position farthest from the polygon mirror 14) and gradually higher therefrom toward a periphery (i.e., the surfaces of the annular zones at the periphery become closer to the polygon mirror 14). In other words, a macroscopic shape of the diffracting surface 15a is a concave shape.

The diffracting surface 15a is usually formed by molding. A mold for molding the diffracting surface 15a is cut with a cutting tool using a lathe. A border between adjacent annular zones must be correctly cut to suppress the occurrence of an unnecessary diffracting light beam caused by a phase error. If each of the annular zones which constitute the diffracting surface is formed to have a curved shape, a cutting tool having a very fine tip must be used to correctly cut the border between the annular zones.

Since the cutting tool having the fine tip is greatly worn, it is not suitable to cut a mold for a lens to be used in the scanning optical system since a lens for the scanning optical system has a relatively large diameter.

If the each of the annular zones which constitute the diffracting surface 15a is formed to have a flat surface as shown in FIG. 4, a mold for molding the diffracting surface 15a can be cut with a cutting tool having an edge formed to have a flat surface. Since the flat surface of a diamond cutting tool is formed by crystal structures, it has a pinpoint accuracy. Further, the diamond cutting tool has a large contact area, and is relatively less worn and can accurately cut a mold as designed. As a result, in the resultant diffraction element 15, generation of a scattering light beam due to a cutting error can be prevented, and an excellent performance can be achieved.

Figure 5:
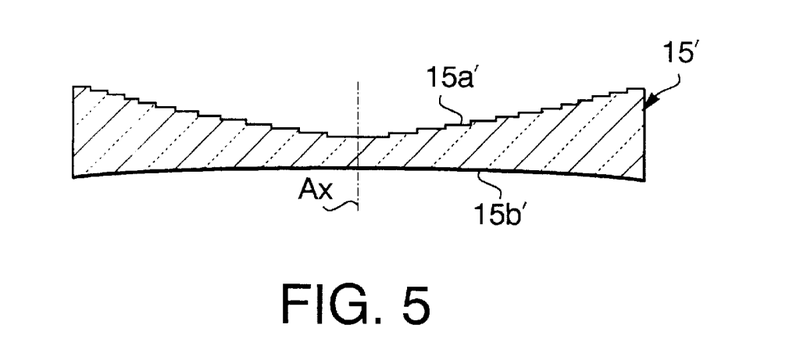
FIG. 5 is a sectional view showing another example of the diffraction element.

The other surface of the diffraction element 15, where the diffracting surface 15a is not formed, may be formed to be a flat surface 15b as shown in FIG. 4 or may be formed to a curved (concave) surface 15b' having an effective refracting power in the main scanning direction in a periphery as shown in FIG. 5. It is easy to form the flat-surface-based diffraction element 15 as shown in FIG. 4. However, in order to eliminate aberration generated by the macroscopic shape (i.e., aspherical concave shape) of the diffracting surface, it is preferable to form the other surface 15b' of the diffraction element 15 to be a aspherical concave surface which does not have a power in the paraxial region as shown in FIG. 5.

Figure 10:
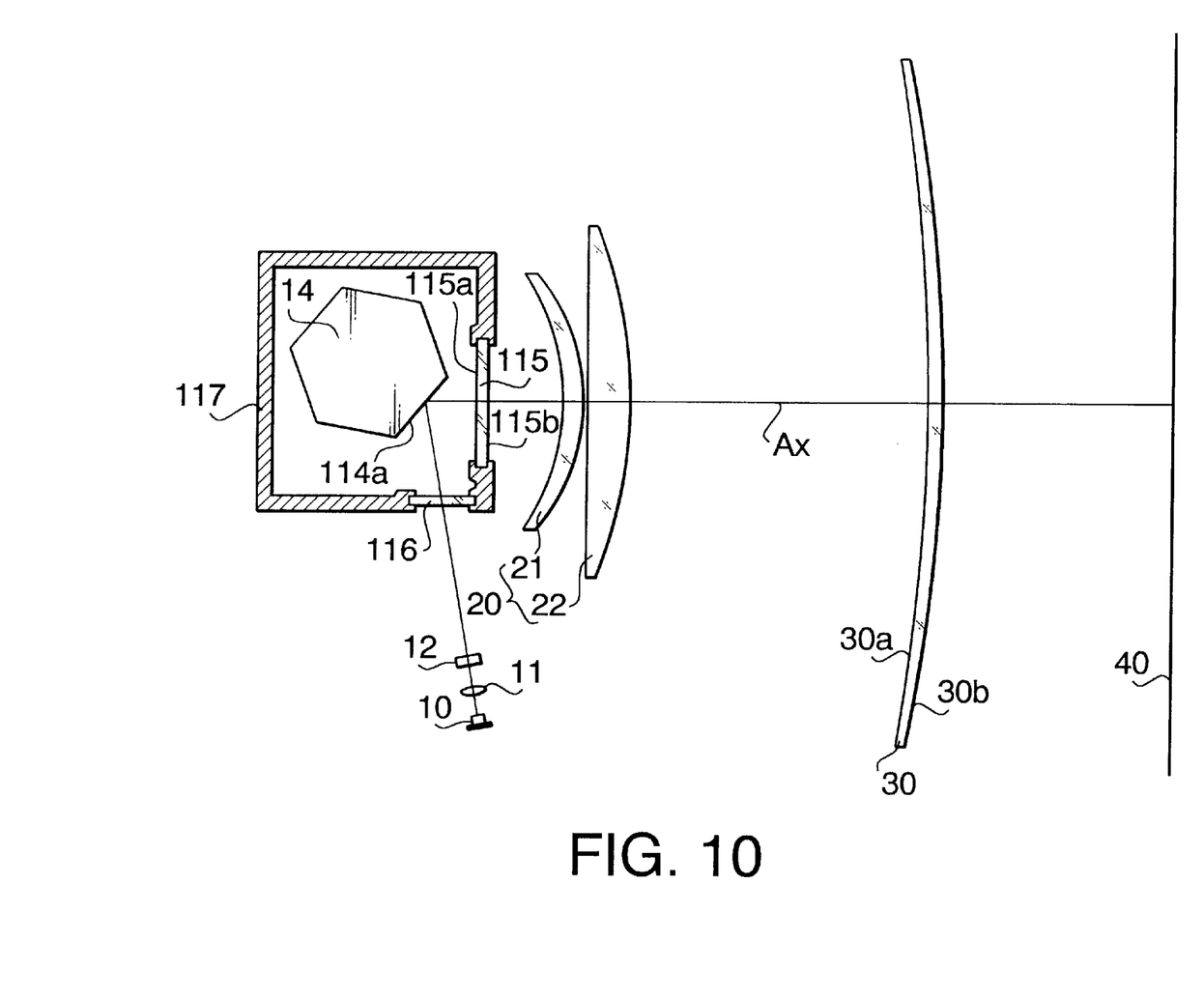
FIG. 10 is a plan view showing a scanning optical system, arranged on a main scanning plane, provided with a cover unit for the polygon mirror.

Although the diffracting surface is formed to the diffraction element 15 which is provided independently of the scanning lens 20 and the correcting lens 30 in the embodiment, it may be possible that, when the polygon mirror is to be covered with a cover unit for preventing rotation noise, the diffracting surface may be formed on a window glass which is disposed to the cover for allowing a reflected light beam to pass therethrough. FIG. 10 shows such a constitution. In FIG. 10, the polygon mirror 14 is covered with a covering unit 117. A window 116 is formed to allow the laser beam to pass through so that the beam emitted by the laser diode 10 is incident on the polygon mirror 14. Further, a cover glass 115 is provided at a portion where the beam reflected by the polygon mirror 14 passes. In this constitution, the cover glass 115 serves as a diffraction element, and a surface 115a may be formed as the diffracting surface. Further, the other surface 115b may be a flat surface or a curved (concave) surface having an effective refracting power in the main scanning direction, similarly to the diffraction element 15 described above.

Embodiments

Three embodiments applicable to the above-described scanning optical system will be described below. In the following embodiments, a structure of an optical system except a diffraction element is the same. That is, in the embodiments below, optical elements provided between a laser diode 10 and a polygon mirror 14, a scanning lens 20 and a correcting lens 30 are substantially the same. Accordingly, the common arrangements will be described only in the first embodiment, and only the diffracting surface will be described in the second and third embodiments.

First Embodiment

Table 1 shows the arrangement of the scanning optical system, according to the first embodiment, from the cylindrical lens 12 to the surface 40. In Table 1, a symbol ry denotes a radius of curvature in a main scanning direction, a symbol rz denotes a radius of curvature in an auxiliary scanning direction (value will be omitted when a surface symmetrical to a rotational axis is employed), d denotes a distance between surfaces along an optical axis (d for surface number 11 represents a distance from the lens surface 30b of a correcting lens 30 to the surface 40) and n denotes a refractive index at a wavelength of 780 nm.

In Table 1, first and second surfaces show the cylindrical lens 12, a third surface shows the mirror surface of a polygon mirror 14, fourth and fifth surfaces show a diffraction element 15, sixth and seventh surfaces show a first lens 21, eighth and ninth surfaces show a second lens 22 and tenth and eleventh surfaces show a correcting lens 30.

In the first embodiment, the lens surfaces 21a and 21b (the sixth and seventh surfaces) of the first lens 21 are rotationally symmetrical aspherical surfaces, the lens surface 22a of the second lens 22 (the eighth surface) is a flat surface, the lens surface 22b (the ninth surface) of the second lens 22 and the lens surface 30b (the eleventh surface) of the correcting lens 30 is a spherical surface and the lens surface 30a (the tenth surface) of the correcting lens 30 on the scanning lens 20 side is a modified toric surface which is defined as a surface by rotating a non-circular curve on a main scanning plane about an axis which extends in the main scanning direction and is perpendicular to the optical axis.

The rotationally symmetrical aspherical surface will be expressed by following formula (1):

$$X(h) = Ch^2 / \left(1 + \sqrt{1 - (1+K)C^2h^2}\right) + A4h^4 + A6h^6 + A8h^8 + A10h^{10} \quad (1)$$

where, X(h) represents a sag amount which is a distance of a point on the aspherical surface whose height (distance) from the optical axis is h with respect to a tangential plane on the aspherical surface on the optical axis;

C represent a curvature (1/r) of the aspherical surface on the optical axis;

K is a conical coefficient; and

A4, A6, A8 and A10 respectively represent fourth-, sixth-, eighth- and tenth-order aspherical coefficients.

The non-arc curve in the main scanning direction which defines the modified toric surface will be expressed by a similar formula (2):

$$X(Y) = CY^2 / \left(1 + \sqrt{1 - (1+K)C^2Y^2}\right) + A4Y^4 + A6Y^6 + A8Y^8 + A10Y^{10} \quad (2)$$

where, X(Y) represents a sag amount which is a distance of a point on the aspherical surface whose height, in the main scanning direction, from the optical axis is Y with respect to a tangential plane on the aspherical surface on the optical axis;

C represent a curvature (1/r) of the aspherical surface on the optical axis;

K is a conical coefficient; and

A4, A6, A8 and A10 respectively represent forth-, sixth-, eighth- and tenth-order aspherical coefficients.

In Table 1, the radius of curvature of the rotationally symmetrical aspherical surface and the radius of curvature of the modified toric surface are the radii of curvature of respective optical elements on the optical axis. The conical coefficient and the aspherical coefficients (the non-arc coefficients) are shown in Table 2.

A symbol E in Table 2 represents a power calculated using 10 as a base and the numeral on the right hand side of E represents an exponent. For example, the value "−1.300E-6" of the aspherical coefficient A4 of the sixth surface in Table 2 means "0.0000013," or "1.3000×10$^{-06}$."

TABLE 1

| f = 200.0 mm | scanning width: 300 mm | angle or field: 43.0° |
| --- | --- | --- |
| | design wavelength: 780 nm | |

| Surface No. | ry | rz | d | n |
| --- | --- | --- | --- | --- |
| 1 | ∞ | 50.000 | 4.000 | 1.51072 |
| 2 | ∞ | — | 94.500 | — |
| 3 | ∞ | — | 18.500 | |
| 4 | diffracting surface | — | 4.000 | 1.48617 |
| 5 | ∞ | — | 27.500 | |
| 6 | −119.890 | — | 7.000 | 1.48617 |
| 7 | −97.677 | — | 2.000 | |
| 8 | ∞ | — | 15.000 | 1.76591 |
| 9 | −193.160 | — | 110.000 | |
| 10 | −663.528 | 32.298 | 5.000 | 1.48617 |
| 11 | −672.444 | — | 88.120 | |

TABLE 2

| Surface # | K | A4 | A6 | A8 | A10 |
| --- | --- | --- | --- | --- | --- |
| 6 | 2.80 | −1.300E-6 | 3.873E-10 | 1.020E-15 | 0.000 |
| 7 | 0.80 | −1.010E-6 | 1.476E-10 | 2.110E-14 | 0.000 |
| 11 | 0.00 | 8.526E-9 | 3.920E-13 | −2.517E-17 | 0.000 |

The lens surface 30a of the correcting lens 30 is defined as the locus obtained by rotating the non-arc curve defined by the above formula about an axis which is parallel to the main scanning direction and crosses the optical axis at a position apart by 32.298 mm, toward the surface 40, from a point where the non-arc curve intersects with the optical axis.

The shape of the diffracting surface (the fourth surface) of the diffraction element 15 will be expressed, as SAG(h), by the following formula (3) which represents the sum of the macroscopic shape X(h) which is expressed by the aspherical shape formula (1) and the sag amount S(h) to be added for realizing a diffracting characteristics:

$$SAG(h) = X(h) + S(h) \quad (3)$$

The sag amount S(h) for providing the diffracting characteristics with the macroscopic shape will be expressed by the following formula (4) based on an optical path length difference function Δφ(h) which represents an amount of optical path length to be added by a diffracting lens as a function of the height h with respect to the optical axis. The optical path length difference function Δφ(h) will be expressed by the following formula (4).

$$\Delta\phi(h) = (P2h^2 + P4h^4 + P6h^6 + P8h^8 + P10h^{10}) \times \lambda \quad (4)$$

where, P2, P4 . . . represent second-, fourth-, sixth-, eighth, and tenth-order diffraction coefficients and λ represents the design wavelength. In this type of expression, when the coefficient P2 of the term of h$^2$ is negative, the surface provides a positive power in the paraxial region. Further, when the coefficient P4 of the term h4 is positive, a negative power is increased toward a periphery.

The sag amount S(h) for providing the diffracting characteristics can be determined by the following formula (5) to provide an additive amount of Fresnel-lens-type additive optical path length in which the component of an integer multiple of the wavelength of the optical path length is eliminated.

$$S(h) = (MOD(P2h^2 + P4h^4 + P6h^6 + \cdots + Const, -1) - Const) \times \frac{\lambda}{n - 1 + Bh^2} \quad (5)$$

The constant term Const is a constant for setting the phase of the boundaries of the annular zones and any numeral 0 or greater and less than 1 may be set as the constant. MOD(x, y) is a modulo function for obtaining a remainder when x is divided by y, n represents the refractive index of the diffraction element 15, and B represents a coefficient for correcting the change of an additive amount of phase which is caused when an off-axis light beam is obliquely incident on the diffraction element. The height h when the value of (MOD(P2h$^2$+P4h$^4$+ . . . +Const, −1) is 0 represent the boundaries of the annular zones. The diffracting surface 15a can be obtained by setting a gradient and a step so that the optical path length difference S(h) is provided on a base shape which is expressed by the aspherical surface function X(h). In the embodiments, "Constant" is set to 0.5 (Const= 0.5).

The relationship between the annular zone number counted from the center, with the optical axis being represented by 0, toward the periphery, and a height h from the optical axis will be expressed by the following formula (6).

$$N = INT|\Delta\phi(h)/\lambda + Const| \quad (6)$$

In the first embodiment, the values of the conical constant K, aspherical constants A4, A6, A8 and A10, curvature C, diffraction constant P2, P4, P6, P8, P10, and the correction coefficient B for defining the macroscopic aspherical surface shape X(h) on which the diffraction structure is formed are indicated in Table 3. In Table 3, a symbol fd represents a focal length of the diffracting surface at the design wavelength. In the first embodiment, the respective annular zones on the diffracting surface of the diffraction element are formed to have a curved shape, and the surface of the diffraction element where the diffracting surface is not formed is a flat surface.

TABLE 3

| fd = | 1565.0741 mm | | |
|---|---|---|---|
| K | 0.000 | | |
| C (=1/r = 1/−760.89002) = −1.31425E−3 | | | |
| A4 | −1.20076E−12 | P2 | −4.09582E−1 |
| A6 | 9.11067E−16 | P4 | −5.2770E−5 |
| A8 | 0.00000 | P6 | 1.0558E−8 |
| A10 | 0.00000 | P8 | −1.0710E−14 |
| B | 3.61414E−4 | P10 | −3.2236E−19 |

Figure 6A:
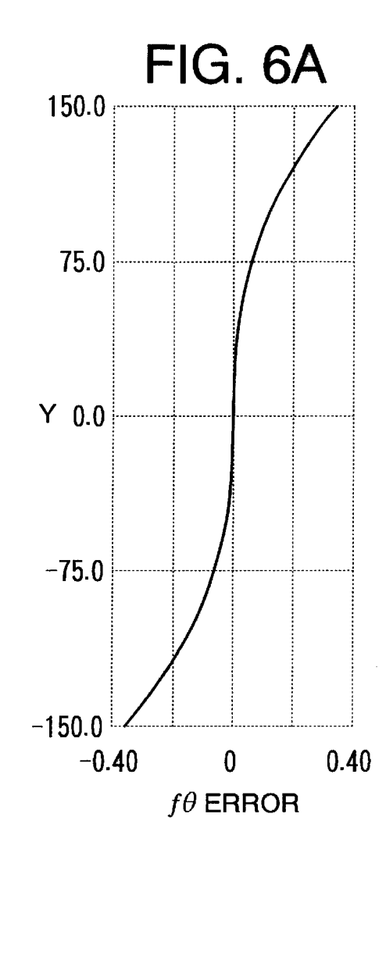
FIG. 6A is a graph showing an fθ error of a first embodiment.
Figure 6B:
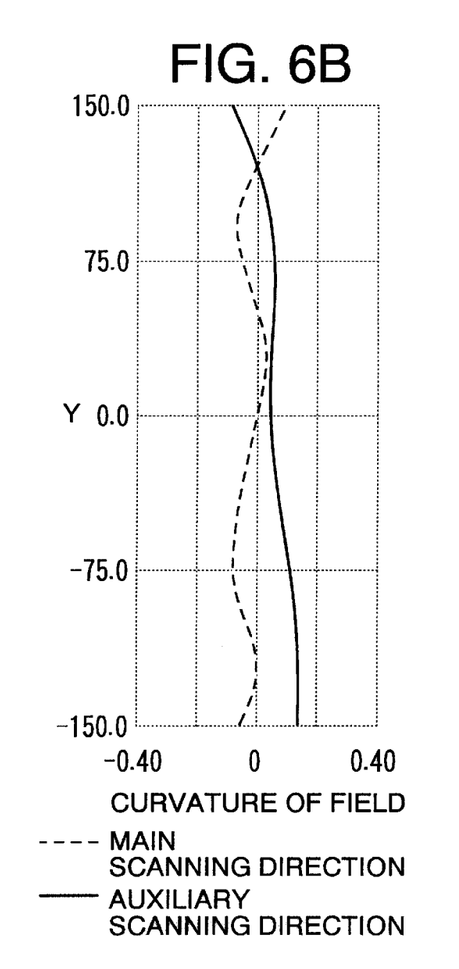
FIG. 6B is a graph showing a curvature of field in a main scanning direction and an auxiliary scanning direction.
Figure 6C:
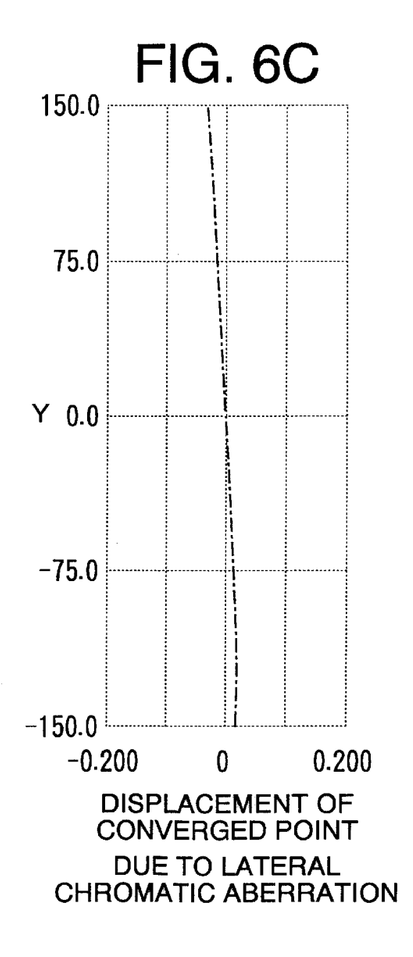
FIG. 6C is a graph showing displacement of a converged position due to a lateral chromatic aberration of the first embodiment.

FIG. 6A is a graph showing an fθ error of the first embodiment, FIG. 6B is a graph showing a curvature of field in a main scanning direction and an auxiliary scanning direction, and FIG. 6C is a graph showing displacement of a converged position due to a lateral chromatic aberration of the first embodiment.

In the respective graphs, the vertical axis represents an image height (the distance in the main scanning direction from the optical axis on the surface 40) and the horizontal axis represents amounts of respective aberrations occurred. The above values are indicated in a unit of mm. FIG. 6C shows a displacement of the converged position (the position of the spot), when an actual wavelength of the beam is 760 nm, at each image height due to the lateral chromatic aberration with respect to the converged position of the beam having the design wavelength of 780 nm.

Second Embodiment

Tables 4 and 5 indicate values of the respective coefficients which show the diffraction element of the scanning optical system according to the second embodiment. In the second embodiment, each of the annular zones of the diffracting surface of the diffraction element is formed to have a flat surface which is perpendicular to the optical axis. The other surface of the diffraction element where the diffracting surface is not formed is a rotationally symmetrical concave aspherical surface. Table 4 indicates the values of the respective coefficients representing the diffracting surface. Table 5 indicates the values of the conical coefficient of the surface of the diffraction element where the diffracting surface is not formed and the value of an aspherical surface coefficient.

Figure 7A:
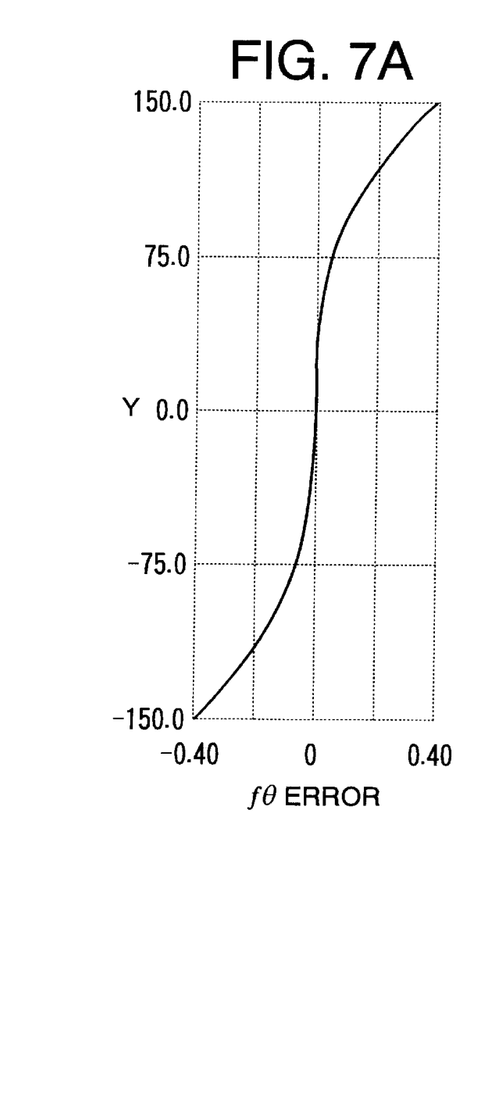
FIG. 7A is a graph showing an fθ error of a second embodiment.
Figure 7B:
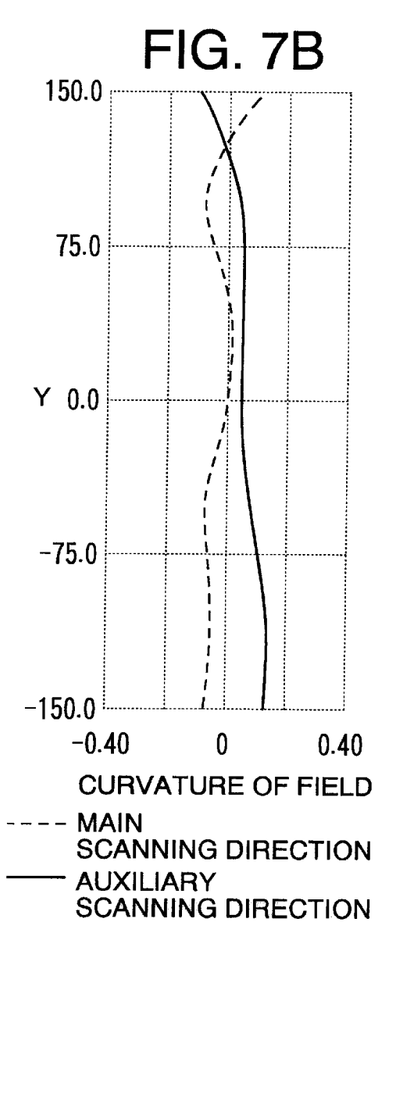
FIG. 7B is a graph showing a curvature of field in a main scanning direction and an auxiliary scanning direction.
Figure 7C:
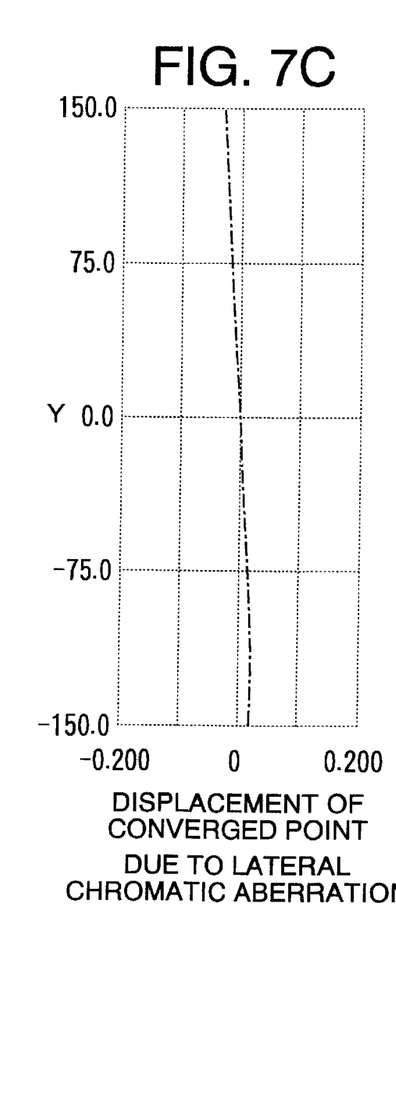
FIG. 7C is a graph showing displacement of a converged position due to a lateral chromatic aberration of the second embodiment.

FIG. 7A is a graph showing an fθ error of the second embodiment, FIG. 7B is a graph showing a curvature of field in the main scanning direction and the auxiliary scanning direction, and FIG. 7C is a graph showing displacement of a converged position due to a lateral chromatic aberration of the second embodiment.

TABLE 4

| fd = | 1565.0736 mm | | |
|---|---|---|---|
| K | 0.00000 | | |
| C (=1/r = 1/−760.89218) = −1.31425E−3 | | | |
| A4 | −1.59249E−7 | P2 | −4.09582E−1 |
| A6 | −3.04789E−12 | P4 | −5.2777E−5 |
| A8 | −3.15303E−15 | P6 | 1.0565E−8 |
| A10 | 0.00000 | P8 | −6.9289E−15 |
| B | 3.61414E−4 | P10 | −1.5455E−17 |

TABLE 5

| C (=1/r = 1/∞) = 0.0000 | | | |
|---|---|---|---|
| K | 0.0000 | | |
| A4 | 1.2000E−7 | A8 | 0.0000 |
| A6 | 0.0000 | A10 | 0.0000 |

EXAMPLE 3

Table 6 shows the values of the coefficients representing the scanning optical system according to the third embodiment. In the third embodiment, each of the annular zones on the diffracting surface which is formed on the image surface side surface of the diffraction element is formed to have a flat surface which is perpendicular to the optical axis. The other surface of the diffraction element on the polygon mirror side where the diffracting surface is not formed is formed to be a cylindrical surface (rz=400.00) having a power only in the auxiliary scanning direction. When the diffraction element is disposed in a light beam diverging in the auxiliary scanning direction and the macroscopic shape of the diffraction element is formed to have parallel flat surfaces, an image plane in the auxiliary scanning direction shifts in a direction where the image plane is away from the polygon mirror 14. The cylindrical surface is provided to correct the above-described shift of the image plane in the auxiliary scanning direction.

Figure 8A:
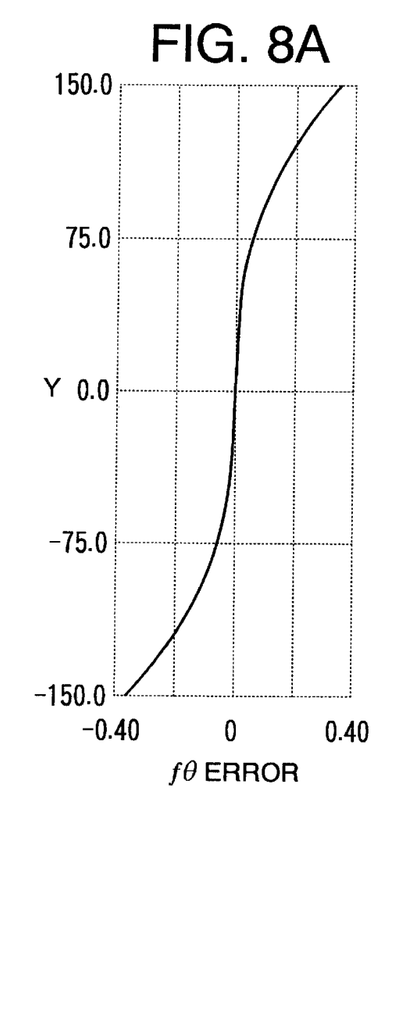
FIG. 8A is a graph showing an fθ error of a third embodiment.
Figure 8B:
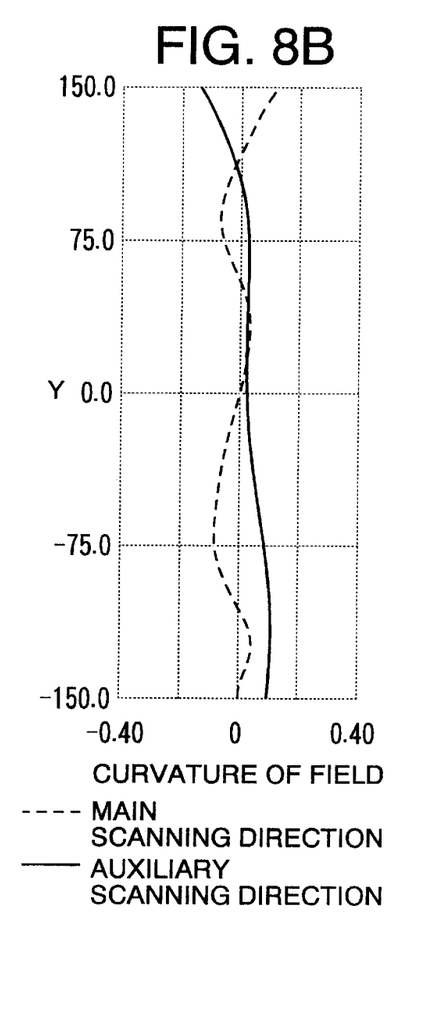
FIG. 8B is a graph showing a curvature of field in a main scanning direction and an auxiliary scanning direction.
Figure 8C:
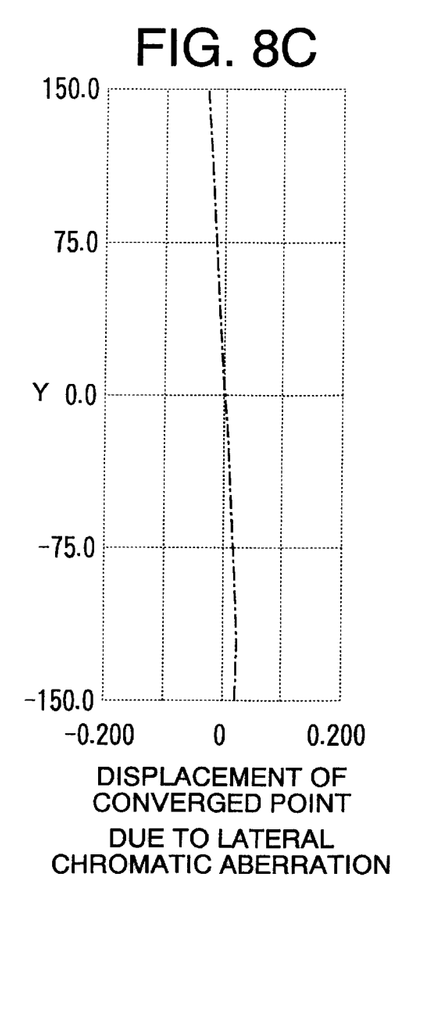
FIG. 8C is a graph showing displacement of a converged position due to a lateral chromatic aberration of the third embodiment.

FIG. 8A is a graph showing an fθ error of the third embodiment, FIG. 8B is a graph showing a curvature of field in the main scanning direction and the auxiliary scanning direction, and FIG. 8C is a graph showing displacement of a converged position due to a lateral chromatic aberration of the third embodiment.

TABLE 6

| fd = | 1841.9263 mm | | |
|---|---|---|---|
| K | 0.0000 | | |
| C (=1/r = 1/895.48792) = 1.11671E−3 | | | |
| A4 | 3.24593E−9 | P2 | −3.48019E−1 |
| A6 | −1.02167E−12 | P4 | −3.2909E−5 |
| A8 | −1.55431E−16 | P6 | 3.9250E−9 |
| A10 | 0.00000 | P8 | −5.3778E−15 |
| B | 1.1057E−4 | P10 | −4.2084E−19 |

Table 7 indicates the number N of steps [per mm] on the diffraction element in each of the first through third embodiment, calculated from equations (4) and (6), at the height of 10 mm.

TABLE 7

| | 1st embodiment | 2nd embodiment | 3rd embodiment |
|---|---|---|---|
| P2 | −4.09582E−01 | −4.09582E−01 | −3.48019E−01 |
| P4 | −5.27700E−05 | −5.27700E−05 | −3.29090E−05 |

TABLE 7-continued

|       | 1st embodiment | 2nd embodiment | 3rd embodiment |
|-------|----------------|----------------|----------------|
| P6    | 1.05580E−08    | 1.05650E−08    | 3.92500E−09    |
| P8    | −1.07100E−14   | −6.92890E−15   | −5.37780E−15   |
| P10   | −3.22360E−19   | 1.54550E−17    | −4.20840E−19   |
| h     | 10             | 10             | 10             |
| Const | 0.5            | 0.5            | 0.5            |
| λ     | 780            | 780            | 780            |
| Δφ (h)| −32350.7676    | −32350.81632   | −27399.11112   |
| N     | 40             | 40             | 34             |

Figure 9A:
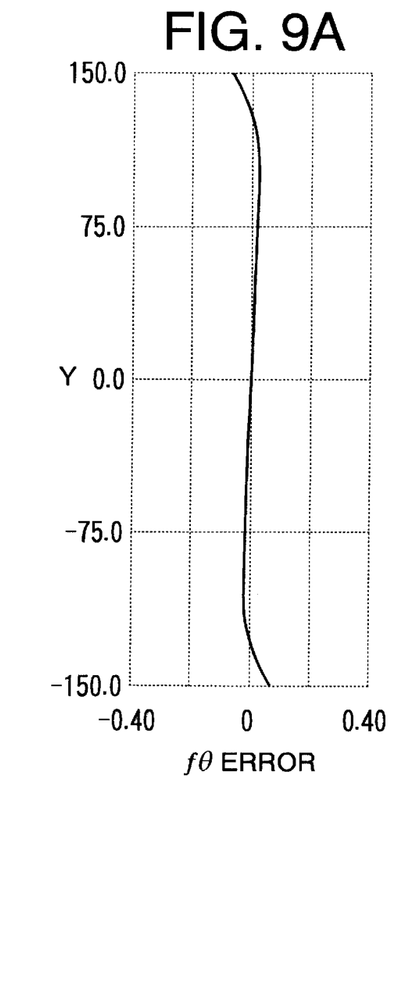
FIG. 9A is a graph showing an fθ error when a diffraction element is removed from the scanning optical system.
Figure 9B:
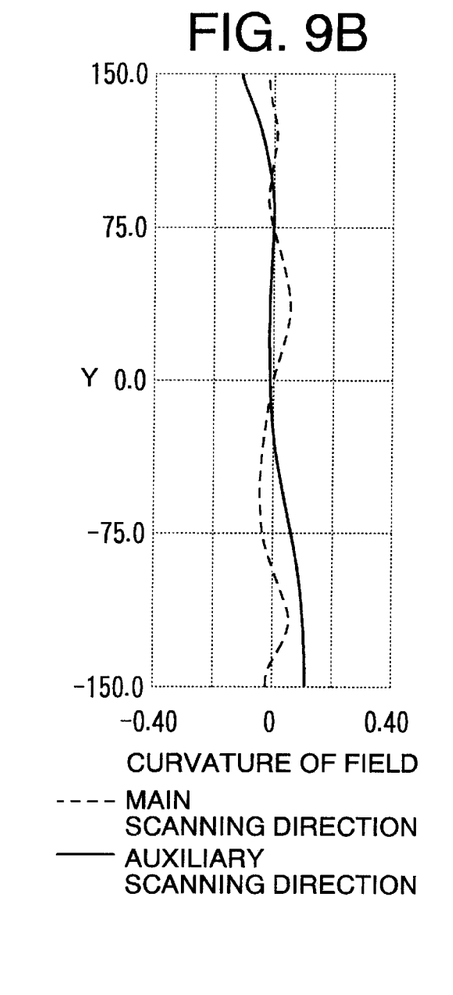
FIG. 9B is a graph showing a curvature of field in a main scanning direction and an auxiliary scanning direction when a diffraction element is removed from the scanning optical system.
Figure 9C:
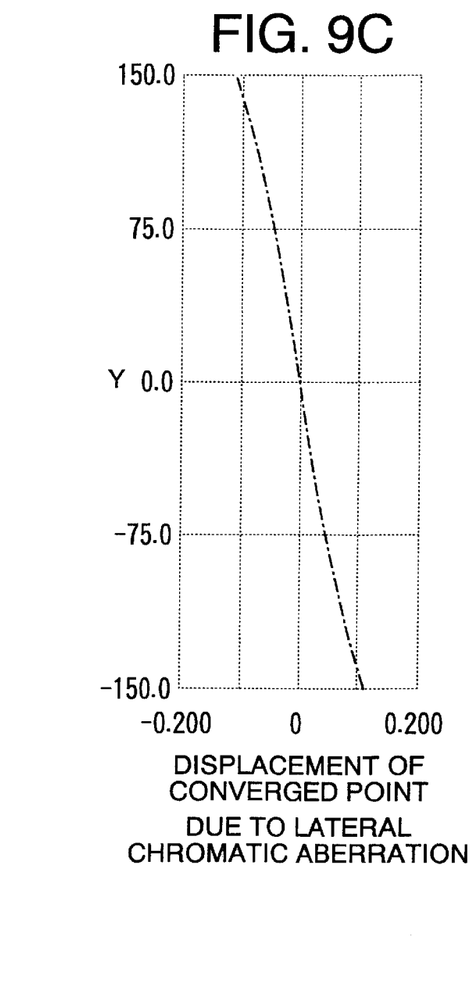
FIG. 9C is a graph showing displacement of a converged position due to a lateral chromatic aberration when a diffraction element is removed from the scanning optical system.

FIG. 9A is a graph showing an fθ error of a comparative scanning optical system, FIG. 9B is a graph showing a curvature of field in the main scanning direction and the auxiliary scanning direction, and FIG. 9C is a graph showing displacement of a converged position due to a lateral chromatic aberration of the comparative scanning optical system.

The comparative scanning optical system is similar to the scanning optical system shown in FIGS. 1 and 2 (i.e., the above-described embodiments) except that the diffraction element 15 is removed therefrom. When FIGS. 6A–6C, 7A–7C, and 8A–8C are compared with FIGS. 9A–9C, it can be understood that the diffraction element 15 suppresses the displacement of the focused position due to the lateral chromatic aberration to $\frac{1}{5}$–$\frac{1}{10}$ of that caused when the diffraction element 15 is not provided, although the fθ error is somewhat increased.

As described above, according to the present invention, the chromatic aberration of the entire scanning optical system can be corrected by interposing the diffracting surface having the chromatic aberration correcting function between the deflector, or the polygon mirror of the scanning optical system and the surface to be scanned. As a result, the displacement of a converged position (i.e., a spot position) on the surface to be scanned can be suppressed to a small amount even if the wavelength of the laser beam emitted from the light source is different from a design wavelength. Thus, the error of a drawing position can be suppressed to a small amount.

Further, since the chromatic aberration can be corrected only by adding the diffracting surface to an. existing scanning optical system, a scanning optical system capable of correcting chromatic aberration can be provided at a low cost as compared with a case that a scanning optical system is entirely redesigned.

The present disclosure relates to a subject matter contained in Japanese Patent Application No. HEI 09-211367, filed on Jul. 22, 1997, which is expressly incorporated herein by reference in its entirety.

What is claimed is:

1. A scanning optical system, comprising:
   a light source that emits a light beam;
   a deflector that deflects a light beam emitted from said light source to scan in a predetermined direction;
   a scanning lens system that allows said light beam deflected by said deflector to pass through and converges said light beam on a surface to be scanned; and
   a diffracting element having a diffracting surface that functions to correct a lateral chromatic aberration of said scanning lens, said diffracting element being arranged between said deflector and said surface to be scanned wherein said diffracting surface has no power in a paraxial region.

2. The scanning optical system according to claim 1, wherein said diffracting surface is composed of a plurality of annular zones concentrically formed about the optical axis, a macroscopic shape of said diffracting surface being a concave surface.

3. The scanning optical system according to claim 2, wherein each of said annular zones of said diffracting surface are formed to have a flat surface which are parallel to each other.

4. The scanning optical system according to claim 3, wherein a surface of said diffraction element on which said diffracting surface is not formed is formed to be a flat surface.

5. The scanning optical system according to claim 3, wherein a surface of said diffraction element on which said diffracting surface is not formed is formed to be a concave surface.

6. The scanning optical system according to claim 5, wherein said concave surface is formed to have no power in the paraxial region thereof.

7. The scanning optical system according to claim 1, wherein said diffracting element is located between said deflector and said scanning lens system.

8. The scanning optical system according to claim 1, wherein said light source emits a plurality of light beams, each of said plurality of light beams being deflected by said deflector and passing through said diffraction element and said scanning lens system.

9. The scanning optical system according to claim 1, further comprising a cover unit for covering said deflector, said diffraction element being provided at a portion of said cover unit through which said light beam deflected by said deflector and directed towards said scanning lens system passes.

10. A diffraction element to be interposed in a scanning optical system having a light source that emits a light beam, a deflector that deflects a light beam emitted from said light source to scan in a predetermined direction, and an scanning lens system that allows said light beam deflected by said deflector to pass through and converges said light beam on a surface to be scanned,
   said diffraction element having a diffracting surface that functions to correct a lateral chromatic aberration of said scanning lens, wherein said diffracting surface has no power in a paraxial region.

11. The diffraction element according to claim 10, wherein said diffracting element is arranged between said deflector and said surface to be scanned.

12. The diffraction element according to claim 10, wherein said diffracting surface is formed to have a plurality of annular zones concentrically formed about the optical axis, a macroscopic shape of said diffracting surface being a concave surface.

13. The diffraction element according to claim 12, wherein each of said annular zones of said diffracting surface are formed to have a flat surface which are parallel to each other.

14. The diffraction element according to claim 13, wherein a surface of said diffraction element on which said diffracting surface is not formed is formed to be a flat surface.

15. The diffraction element according to claim 13, wherein a surface of said diffraction element on which said diffracting surface is not formed is formed to be a concave surface.

16. The diffraction element according to claim 15, wherein said concave surface is formed to have no power in the paraxial region thereof.

17. The diffraction element according to claim 10, which is located between said deflector and said scanning lens system.

18. The diffraction element according to claim 10, wherein said scanning optical system is provided with a cover unit for covering said deflector, said diffraction element being provided at a portion of said cover unit through which said light beam deflected by said deflector and directed towards said scanning lens system passes.

19. A scanning optical system, comprising:

a light source that emits a light beam;

a deflector that deflects a light beam emitted from said light source to scan in a predetermined direction;

a scanning lens system that allows said light beam deflected by said deflector to pass through and converges said light beam on a surface to be scanned;

a diffracting element having a diffracting surface that functions to correct a chromatic aberration of said scanning lens, said diffracting element being arranged between said deflector and said surface to be scanned; and a cover unit for covering said deflector, said diffraction element being provided at a portion of said cover unit through which said light beam deflected by said deflector and directed towards said scanning lens system passes.

20. A diffraction element to be interposed in a scanning optical system having a light source that emits a light beam, a deflector that deflects a light beam emitted from said light source to scan in a predetermined direction, and an scanning lens system that allows said light beam deflected by said deflector to pass through and converges said light beam on a surface to be scanned, said diffraction element having a diffracting surface that functions to correct a chromatic aberration of said scanning lens, wherein said scanning optical system is provided with a cover unit for covering said deflector, said diffraction element being provided at a portion of said cover unit through which said light beam deflected by said deflector and directed towards said scanning lens system passes.

* * * * *